United States Patent
Fukuda et al.

[11] Patent Number: 5,746,801
[45] Date of Patent: May 5, 1998

[54] PROCESS OF PRODUCING FLUORIDE GLASS

[75] Inventors: Chie Fukuda; Masashi Onishi; Hiroo Kanamori, all of Yokohama, Japan

[73] Assignee: Sumitomo Electric Industries, Ltd., Osaka, Japan

[21] Appl. No.: 785,835

[22] Filed: Jan. 15, 1997

Related U.S. Application Data

[62] Division of Ser. No. 262,063, Jun. 17, 1994, abandoned.

[30] Foreign Application Priority Data

Jun. 18, 1993 [JP] Japan ........................ 5-147211

[51] Int. Cl.⁶ ........................ C03B 37/00; C03B 3/02
[52] U.S. Cl. ........................ 65/379; 65/388; 65/404; 65/374.12; 65/32.5; 65/29.15; 65/DIG. 16; 65/424
[58] Field of Search ........................ 65/379, 388, 404, 65/374.12, DIG. 16, 424, 32.5, 29.15

[56] References Cited

U.S. PATENT DOCUMENTS

| | | | |
|---|---|---|---|
| 4,040,807 | 8/1977 | Midwinter | 65/32.5 |
| 4,211,155 | 7/1980 | Stoll | |
| 4,539,032 | 9/1985 | Tran | |
| 4,659,355 | 4/1987 | Maze et al. | |
| 4,666,486 | 5/1987 | Hutta | |
| 4,741,752 | 5/1988 | France et al. | |
| 4,848,997 | 7/1989 | France et al. | |
| 4,885,019 | 12/1989 | Hutta | |
| 4,946,490 | 8/1990 | Hall | 65/DIG. 16 |
| 5,045,507 | 9/1991 | Tran | |

FOREIGN PATENT DOCUMENTS

| | | |
|---|---|---|
| 0336280 | 10/1989 | European Pat. Off. |
| 53-3350 | 1/1978 | Japan ................ 65/32.5 |
| 61-14064 | 4/1986 | Japan ................ 65/32.5 |
| 6163538 | 4/1986 | Japan. |
| 6158414 | 12/1986 | Japan. |
| 9200923 | 1/1992 | WIPO. |

OTHER PUBLICATIONS

Patent Abstracts of Japan, vol. 9, No. 119 (C–282) May 23, 1985.
Chemical Abstracts, vol. 116, No. 14, Apr. 6, 1992, Columbus, Ohio, US; Abstract No. 134689 & T. Grande et al., Phase Equilibria in the Glass Forming system $ZrF_4$–$BaF_2^1$, Journal of Non–Crystalline Solids, vol. 140, No. 1–3, 1992, Amsterdam NL, pp. 73–76.
Chemical Abstracts, vol. 110, No. 4, Jan. 23, 1989, Columbus, Ohio, US; Abstract No. 028129, JP–A–63 185 830.
France et al. "Fluoride Glass Optical Fibres", 1990, Blackie, London, GB, pp. 105–113, 1990.
Data Base WPI, Section Ch, Week 8318, Derwent Class Lo1 AN 83–42472k.
Alta Frequenza, vol. LVII, No. 1, Jan. 1988, pp. 15–19.
Physics & Chemistry of Glasses, vol. 28, No. 5, Oct. 1987, pp. 188–195.
Physics & Chemistry of Glasses, vol. 30, No. 2, Apr. 1989, pp. 55–58.
Journal of Materials Research, vol. 7, No. 6, Jun. 1992, pp. 1541–1544.

*Primary Examiner*—John Hoffmann
*Attorney, Agent, or Firm*—Cushman Darby & Cushman IP Group of Pillsbury Madison & Sutro LLP

[57] ABSTRACT

A process for producing fluoride glass, including the steps of: introducing a raw material for fluoride glass into a heating vessel; and heating the raw material in the heating vessel, while causing the heating vessel to have a negative internal pressure and introducing an inert gas into the heating vessel, thereby to melt the raw material under heating.

18 Claims, 12 Drawing Sheets

------- : CHARACTERISTIC OF THE FIBER PRODUCED IN EXAMPLE 4 BY USING APPARATUS COMPRISING ONE HEATING VESSEL

───── : CHARACTERISTIC OF THE FIBER PRODUCED IN EXAMPLE 4 BY USING APPARATUS COMPRISING TWO HEATING VESSELS

─·──·── : CHARACTERISTIC OF THE FIBER PRODUCED BY USING APPARATUS NOT PROVIDED WITH Pt TUBE

PROCESS OF PRODUCING FLUORIDE GLASS

This is a division of Application No. 08/262,063, filed Jun. 17, 1994, now abandoned

BACKGROUND OF THE INVENTION

1. Field of the Invention

The present invention relates to a process and an apparatus for producing fluoride glass, which may suitably be used for an optical fiber. More specifically, the present invention relates to a process and an apparatus for producing fluoride glass which is capable of reducing transmission loss and decreasing the amount of impurity contained in the fluoride glass in comparison to conventional processes, and which may suitably be used for an optical fiber.

2. Related Background Art

Heretofore, as an apparatus for producing fluoride glass in an atmosphere of inert gas, there has been known an apparatus disclosed in a reference "Fluoride Glass Optical Fibers", by P. W. FRANCE et al., published by Blackie, 1990, pp 110–112. This apparatus comprises a glove box wherein work or treatment is to be conducted in an atmosphere of inert gas, and a furnace for melting or fusion connected to an upper part of the glove box. This furnace comprises a core tube made of quartz glass (or silica glass). In such an apparatus, a crucible containing therein a raw material for glass can be moved from the melting furnace into the glove box and can be moved from the glove box into the melting furnace, as desired.

A process for producing fluoride glass by using the above-mentioned apparatus is briefly described below.

Thus, there is provided a raw material comprising a component such as $ZrF_4$, $BaF_2$, $LaF_3$, $AlF_3$, $NaF$ and $PbF_2$, to which a fluorinating agent of $NH_4HF_2$ has been added in an amount of 5 to 30 weight % based on the total weight of the raw material. The raw material is placed in a platinum (Pt) crucible and is fluorinated under heating at 400° C. A reaction formula for this fluorination is as follows:

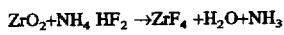

$$ZrO_2 + NH_4HF_2 \rightarrow ZrF_4 + H_2O + NH_3$$

Subsequently, the raw material is melted under heating at 850° C.–950° C. to provide a molten mixture. Thereafter, the resultant molten mixture is vitrified by casting.

However, when the above-mentioned apparatus and process are used, there is posed a problem such that fine crystals are formed in the resultant glass after quenching or rapid cooling.

An optical fiber comprising fluoride glass is excellent in transmission characteristic in a long wavelength range, as compared with that of an optical fiber comprising quartz glass. In addition, it is theoretically predicted that an optical fiber comprising fluoride glass can provide a transmission loss of $10^{-2}$ dB/km or less. Accordingly, it is expected that such an optical fiber comprising fluoride glass is useful as an optical fiber for long-distance communication and a host fiber for optical amplification. However, at present, fluoride glass produced by a conventional process can only provide a transmission loss of approximately 0.45dB/km in a wavelength range in the neighborhood of 2.2 μm which can generally provide a minimum transmission loss. Such a phenomenon is attributable to a problem in the production process thereof.

One of the reason for the above-mentioned high transmission loss may be that the fluoride glass is liable to provide crystals to be formed therein, and the thus formed crystals make it difficult to reduce the loss due to scattering. It is known that most of these crystals are grown on the basis of an impurity such as oxide and water component (OH group) as a nucleus or germ of crystallization. As a method for removing such an impurity, there have been proposed several methods.

Typical example of the above removing method include: a method wherein oxide and water content are reacted with a gas such as $NF_3$ and are removed from the resultant product (as disclosed in Japanese Laid-Open Patent Application (KOKAI) No. 63538/1986, i.e., Sho 61-63538); and a method wherein oxide and water content are reacted with HF produced from the thermal decomposition of $NH_4F \cdot HF$ and are removed from the resultant product (as disclosed in Japanese Patent Publication (KOKOKU) No. 58414/1986, i.e., Sho 61-58414). Further, International Publication No. WO 92/00923 (British Telecommunications) discloses a method for the preparation of halide glass articles, and U.S. Pat. No. 4,659,355 (Maze et al.) discloses a process for manufacture of fluoride glass fibers and optical components.

However, the above-mentioned method using $NF_3$ has a defect such that since the activation temperature of $NF_3$ is as relatively high as 500°–800° C., a container containing therein the raw material and the material of the furnace are considerably corroded by the $NF_3$. On the other hand, according to the present inventors' investigation, when the above-mentioned method employing $NH_4F \cdot HF$ is used, the prevention of the crystallization in the resultant glass product is not necessarily sufficient.

SUMMARY OF THE INVENTION

An object of the present invention is to provide a process or apparatus for producing fluoride glass, which is capable of solving the above problems encountered in the prior art.

Another object of the present invention is to provide a process or apparatus for producing fluoride glass, which is capable of easily removing an impurity from the resultant product.

A further object of the present invention is to provide a process or apparatus for producing fluoride glass, which is capable of providing fluoride glass suitable for an optical fiber with low transmission loss.

A further object of the present invention is to provide a process or apparatus for producing fluoride glass, which is capable of providing fluoride glass containing substantially no residual of $NH_3$ or HF even when $NH_4F \cdot HF$ is added to a raw material for the glass.

According to the present invention, there is provided a process for producing fluoride glass, comprising:

introducing a raw material for fluoride glass into a heating vessel; and heating the raw material in the heating vessel, while causing the heating vessel to have a negative internal pressure and introducing an inert gas into the heating vessel, thereby to melt the raw material under heating.

In the present invention, the raw material for fluoride glass may generally be introduced in the heating vessel in a powder state.

The present invention also provides a process for producing fluoride glass as described above, wherein the raw material is introduced into the heating vessel after a fluorinating agent is added to the raw material.

The above-mentioned process according to the present invention is particularly effective in a case where $NH_4F \cdot HF$ is added as a fluorinating agent to a raw material for fluoride glass.

In the present invention, the negative internal pressure of the heating vessel may preferably be −50 to −1000 mmH$_2$O (915 mbar–1008 mbar).

In the present invention, the inert gas may preferably be introduced into the heating vessel at a flow rate of 1 to 10 liters/min.

In the present invention, the inert gas may preferably comprise at least one or a mixture of at least two species selected from N$_2$, Ar and He.

In the present invention, the heating vessel may preferably be one which is provided with adjusting means for detecting the internal pressure of the heating vessel and automatically adjusting the internal pressure to a predetermined value; and the raw material is melted under heating while the internal pressure of the vessel is automatically adjusted.

In the present invention, in an embodiment wherein NH$_4$HF$_2$, is added to the raw material, the raw material may preferably be heated in the heating vessel in a heating step which comprises at least a first heating stage wherein the raw material is heated at 300°–500° C., a second heating stage wherein the raw material is heated up to 700°–900° C., and a third heating stage wherein the temperature is maintained at 600°–900° C.

In the present invention, in an embodiment wherein NH$_4$HF$_2$ is not substantially added to the raw material, the raw material may preferably be heated in the heating vessel in a heating step which comprises at least a second heating stage wherein the raw material is heated up to 700°–900 °C., and a third heating stage wherein the temperature is maintained at 600°–900° C.

In the above-mentioned first heating stage, the raw material may preferably be heated at 300°–500° C. for 30–60 min. In the second heating stage, the raw material may preferably be heated up to 700°–900° C. at a temperature increasing rate of not less than 20° C./min. In the third heating stage, the raw material may preferably be heated at 600°–900° C. for 30–90 min.

The present invention further provides an apparatus for producing fluoride glass, comprising:

a heating vessel for containing therein a crucible containing a raw material for fluoride glass to melt the raw material thereby to provide a molten mixture, the heating vessel having an internal surface composed of a metal material comprising platinum; and an operating vessel communicated with the heating vessel, for subjecting the molten mixture to casting in an atmosphere of inert gas.

In the present invention, the above apparatus may preferably comprise at least two heating vessels which are communicated with each other through the operating vessel.

The present invention further provides a process for producing fluoride glass, comprising:

heating a raw material for fluoride glass contained in a crucible together with NH$_4$HF$_2$ in the inside of a heating vessel to provide a molten mixture of the raw material, the heating vessel having an internal surface composed of a metal material comprising platinum; and subjecting the molten mixture to casting in an operating vessel which is communicated with the heating vessel.

The present invention further provides a process for producing fluoride glass, comprising:

heating two species of raw materials for fluoride glass respectively contained in two crucibles together with NH$_4$HF$_2$, in the inside of two heating vessels to respectively provide molten mixtures of the raw materials, each of the heating vessels having an internal surface composed of a metal material comprising platinum; and subjecting the molten mixtures to casting in an operating vessel which is communicated with both of the two heating vessels.

According to the present inventors' investigation, it has been found that, in the prior art, HF gas produced at the time of the fluorination treatment and/or melting or fusion treatment is reacted with SiO$_2$, etc., of the internal surface of a heating vessel (such as the above-mentioned core tube) to provide a reaction product such as SiF$_4$ and Si$_2$F$_6$, which is then incorporated or melted into the resultant glass to produce fine crystals in the glass product after rapid cooling.

According to the present inventors' investigation, it has also been found that, in the conventional method using NH$_4$F·HF, a decomposition product produced from NH$_4$F·HF, such as NH$_3$ and HF is liable to remain in the resultant glass to cause crystallization therein.

On the other hand, in the present invention, since a raw material for fluoride glass is melted under heating in an environment of negative pressure while introducing an inert gas into the reaction system, an impurity produced from the fluorination and/or melting is prevented from remaining in the resultant glass, on the basis of the combination of the negative pressure and the inert gas.

In addition, when the above-mentioned apparatus for producing fluoride glass according to the present invention is used, a raw material for fluoride glass in a crucible is melted in a heating vessel (or heating container) having an inside surface of a metal material comprising platinum (Pt), and a molten mixture is subjecting to casting in an operating vessel (or operating container). In the present invention, since the inside surface of the heating vessel is composed of a metallic material comprising platinum, a fluoride compound (or fluoride product) is not substantially produced on the basis of the reaction between HF gas and the base material of the heating vessel, even when the raw material for fluoride glass is melted to produce HF gas. Accordingly, fine crystals caused by a fluoride compound of the base material mixed into the molten mixture are not substantially formed in the resultant fluoride glass, whereby uniform or homogeneous fluoride glass may be provided.

The apparatus for producing fluoride glass according to the present invention may preferably comprise a plurality of heating vessels at least two of which are communicated with each other through or by way of the operating vessel. In such a case, the temperatures of the at least two heating vessels can be controlled independently, and the optimum temperature for each of raw materials placed in the at least two heating vessels can be set depending on the intended use of each raw material.

Further objects and advantages of the present invention will be apparent from the description of the preferred embodiments with the accompanying drawings.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF PREFERRED EMBODIMENTS

In the present invention, the pressure of the inside of the heating vessel (or heating furnace) may preferably be −50 to −1000 mmH$_2$O (i.e., 915 mbar to 1008 mbar), more preferably −100 to −500 mmH$_2$O. When the internal pressure is lower than −1000 mmH$_2$O, a component having a relatively high vapor pressure (i.e., relatively volatile component) such as AlF$_3$ and ZrF$_4$ is liable to be vaporized and the composition of the resultant product can deviate from the intended composition thereof. In addition, in such a case, NH$_4$F·HF can be decomposed relatively rapidly and the reaction of the resultant HF with oxide contained in the raw material is liable to be insufficient, whereby the oxide can remain in the glass product and an increase in loss is liable to occur in the resultant glass product. On the other hand, when the internal pressure is higher than −50 mmH$_2$O, the decomposition product from the NH$_4$F·HF (i.e., NH$_3$ and/or HF), and H$_2$O produced from the reaction of HF with the oxide cannot be removed sufficiently from the raw material (i.e., the efficiency of the removal of the above-mentioned NH$_3$, HF, and/or H$_2$O from the raw material can be decreased)

In the present invention, the above-mentioned internal pressure (e.g., −50 mmH$_2$O) is expressed in a pressure relative to the atmospheric pressure (1 atm=10336 mmH$_2$O= 1013 mbar). Accordingly, the above-mentioned internal pressure of "−1000 mmH$_2$O" corresponds to (10336−1000) mmH$_2$O, i.e., (9336×0.098=915) mbar, and the above-mentioned internal pressure of "−50 mmH$_2$O" corresponds to (10336−50) mmH$_2$O, i.e., (10286×0.098=1008) mbar.

The amount or flow rate of an inert gas to be introduced into the vessel may preferably be 1 to 10 liters/min. The inert gas to be introduced into the vessel may preferably be one or a mixture of at least two species selected from N$_2$, Ar and He.

In the present invention, the heating vessel may preferably be one provided with means for detecting the internal pressure of the vessel and automatically adjusting the internal pressure of the vessel to a predetermined pressure. When such a heating vessel is used, and the raw material is melted under heating while automatically adjusting the internal pressure of the vessel, the production process can be conducted in a more accurate manner and can be simplified.

In the present invention, fluoride glass may preferably be produced by using a raw material comprising at least two components selected from ZrF$_4$, BaF$_2$, LaF$_3$, AlF$_3$, NaF, PbF$_2$, HfF$_4$, LiF, YF$_3$, ErF$_3$, and PrF$_3$. Such a raw material may preferably be heated at 700°–900° C. to be melted.

Figure 1:
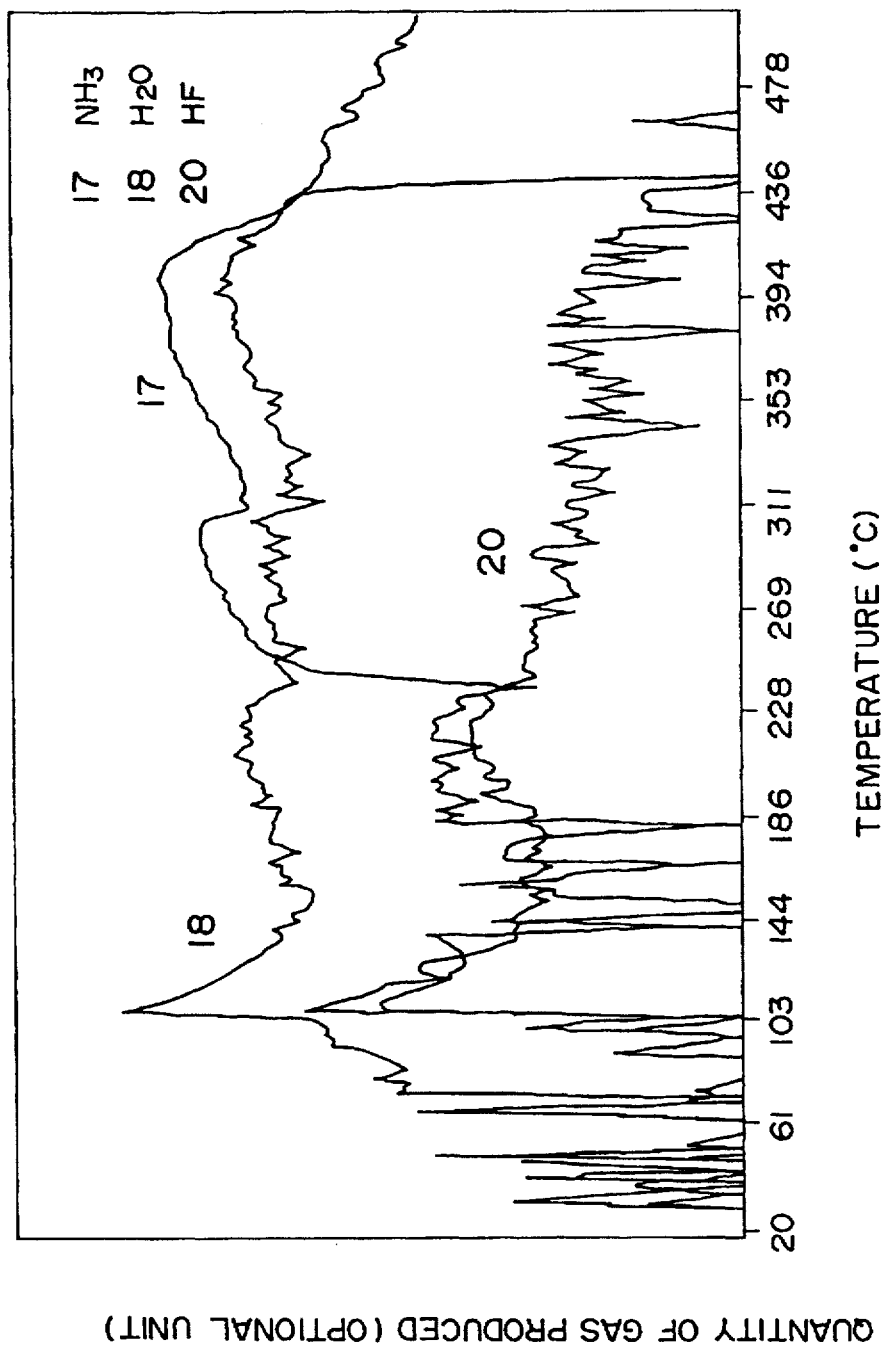
FIG. 1 is a graph showing an example of production of gases when raw materials for fluoride glass are melted or fused under heating.

FIG. 1 shows a state of gas production when a mixture comprising ZrF$_4$, BaF$_2$, LaF$_3$, AlF$_3$, and NaF to which NH$_4$F·HF has been added is heated to be melted. In FIG. 1, kinked or polygonal lines 17, 18 and 20 respectively denote the amounts of production of NH$_3$, H$_2$O and HF. As shown in FIG. 1, production of the gas is initiated in the neighborhood of room temperature, and the temperature range corresponding to the gas production widely extends from the neighborhood of room temperature to 480° C. or higher. Accordingly, the removal of the thus produced gas may preferably be started immediately after the time at which the raw material has been introduced or charged into the heating vessel, and may preferably be conducted continuously until the temperature increasing process is finished. The thus produced gas such as NH$_3$ and HF is soluble in the molten mixture as a gas, and therefore it is effective to reduce the partial pressure of such a gas in an atmosphere to which the molten mixture is exposed, in order to remove the gas from the molten mixture.

The above-mentioned produced gas may generally be prevented from remaining in the resultant glass product, when a dry inert gas is made to flow though the inside of the vessel to replace the atmosphere in the vessel. On the other hand, in the present invention, in addition to the introduction of an inert gas into the vessel, the inside of the vessel is caused to assume a state of negative pressure so that the produced gas possibly remaining among fine particles of a raw material is positively discharged from the raw material to the outside of the raw material.

In addition, in the present invention, since the inside of the vessel is kept at a state of negative pressure at the time of the melting, the produced gas possibly remaining in the melting container can be prevented from being dissolved into the molten mixture, and the discharge of an impurity gas from the molten mixture is promoted or accelerated, even when the impurity gas has been dissolved in the molten mixture.

In the present invention, on the basis of the above-mentioned combination of the negative pressure and the introduction of the inert gas, the amount of an impurity such as NH$_3$, H$_2$O and HF possibly remaining in the resultant fluoride glass can be minimized thereby to provide fluoride glass capable of providing an optical fiber with extremely low transmission loss.

The glass product produced according to the process of the present invention may preferably have a larger Hruby Factor in view of the stability thereof. More specifically, the above glass product may preferably have a Hruby Factor of about 0.20 or larger, more preferably 0.30 or larger. In the present invention, the above glass product may preferably have a Hruby Factor of about 1.5 smaller.

The "Hruby Factor" used herein is defined as follows.

"Hruby Factor" $\equiv (Tx-Tg)/(Tm-Tx)$,
wherein Tg denotes the glass transition temperature of the glass product, Tx denotes the crystallization temperature of the glass product, and Tm denotes the melting temperature of the glass product. These temperatures Tg, Tx and Tm may be measured by use of DSC (differential scanning calorimetry) to be described hereinbelow.

Figure 2:
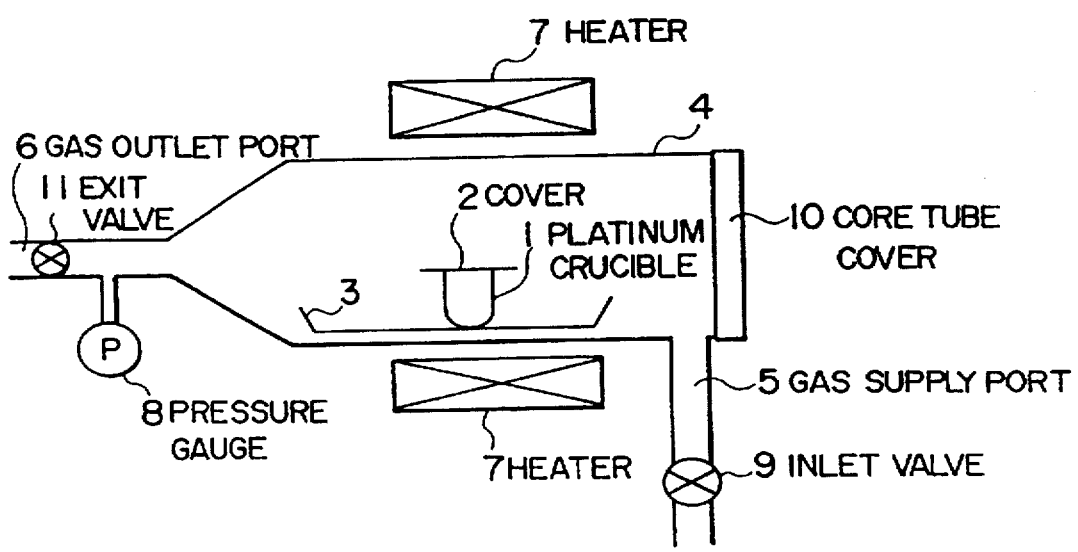
FIG. 2 is a schematic sectional view showing an outline of a heating furnace used in Example 1 appearing hereinbelow.

Further, in an embodiment of the present invention wherein there is used a heating vessel provided with means for detecting an internal pressure in the inside of the vessel to automatically adjust the internal pressure of the vessel to a predetermined value, and the heating and melting are conducted while automatically controlling the internal pressure of the vessel, e.g., in an embodiment as shown in FIG. 2 wherein the pressure detected by a pressure gauge 8 is inputted to a control unit (not shown) and the degree of opening of an outlet or exit valve 11 is regulated depending on the thus detected pressure, the reaction condition may be controlled more accurately and easily.

Figure 3:
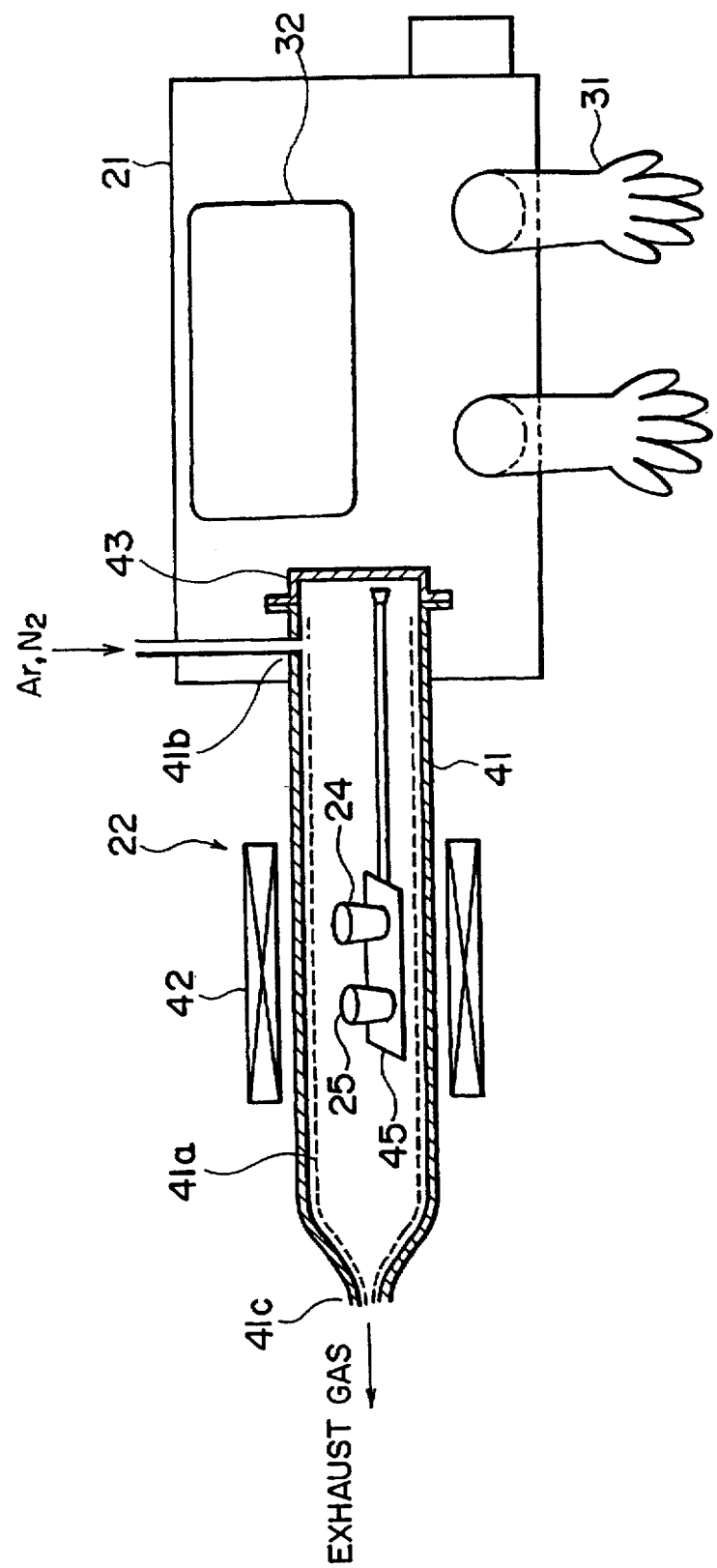
FIG. 3 is a schematic sectional (partially perspective) view showing an apparatus for producing fluoride glass according to an embodiment of the present invention.

FIG. 3 is a schematic sectional (partially perspective) view showing the structure of an apparatus for producing fluoride glass according to an embodiment of the present invention. This apparatus comprises a dry glove box 21 as an operating vessel and a heating furnace 22 as a heating vessel connected to the glove box 21. The heating furnace 22 comprises a core tube 41 formed of quartz (or SiO$_2$ glass), a cap 43 provided at the open end of the core tube 41, and a heater 42 surrounding the circumference of the core tube 41.

The core tube 41 has a columnar or cylindrical space formed in the inside thereof and melting crucibles 24 and 25 are placed in such a space. In the internal space of the core tube 41, there is inserted a platinum tube 41a for providing an internal surface which is made of a tubular platinum plate (sleeve) having a shape corresponding to the internal shape of the core tube 41. In this case, an SiO$_2$ glass member having an inside diameter of 70 mm and a length of 800 mm may be used as the core tube 41, and a tube having an outside diameter of 70 mm, a thickness of 150 µm and a length of 750 mm may be used as the platinum tube 41a to be inserted into the inside of the core tube 41.

An inlet port 41b is provided in the neighborhood of one end of the core tube 41 at which the dry glove box 21 is provided, and an inert gas such as N$_2$ and Ar may be introduced into the core tube 41 through the inlet port 41b. A gaseous substance including the inert gas which has been introduced into the core tube 41, a gas which has been produced in the inside of the core tube 41, etc., may be discharged from an exhaust port 41c provided at the other end of the core tube 41. Crucibles 24 and 25 to be placed in the core tube 41 are disposed on a mount 45, and can be taken out from the core tube 41 and moved to the dry glove box 21 side through the cap 43.

In the inside of the dry glove box 21, there may be provided an operating glove 31, an observation window 32, an entry locking device (not shown), an annealing vessel, etc.

Figure 4:
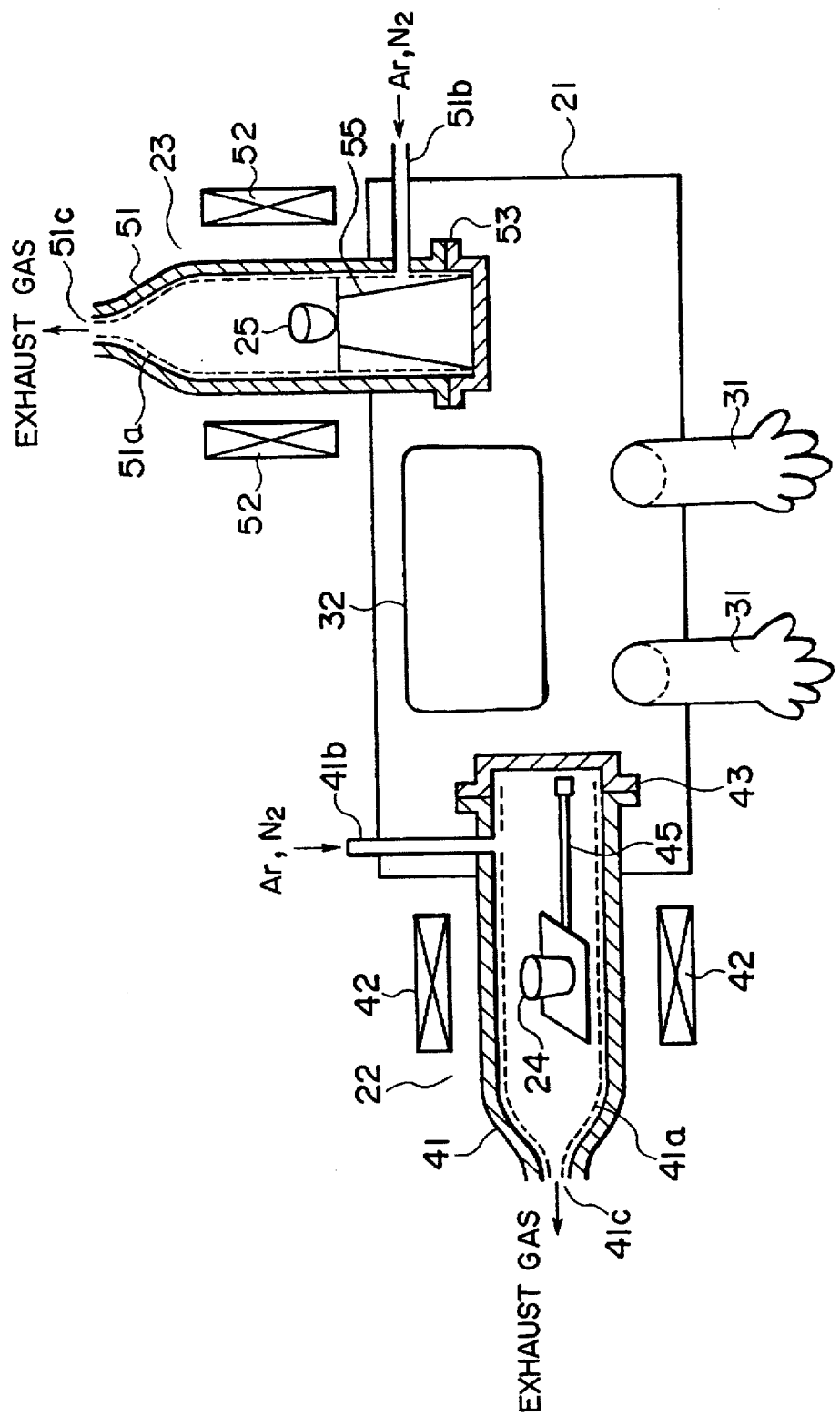
FIG. 4 is a schematic sectional (partially perspective) view showing an apparatus for producing fluoride glass according to another embodiment of the present invention.

Next, there is described another embodiment of the apparatus according to the present invention. FIG. 4 is a schematic sectional (partially perspective) view showing the structure of an apparatus for producing fluoride glass according to another embodiment of the present invention. This apparatus comprises a dry glove box 21 and a plurality of heating vessels connected to the glove box 21. In this embodiment, the plural heating vessels comprise a heating furnace 22 laterally disposed and connected to the glove box 21, and a heating furnace 23 vertically disposed and connected to the glove box 21. Each of the heating furnaces 22 and 23 comprises a core tube 41 (or 51) made of quartz, a cap 43 (or 53) provided at the open end of the core tube 41 (or 51), and a heater 42 (or 52) surrounding the circumference of the core tube 41 (or 51). The core tubes 41 and 51 are formed of SiO$_2$ glass.

The core tubes 41 and 51 have a columnar or cylindrical space formed in the inside thereof and melting crucibles 24 and 25 are respectively placed in these spaces. In the internal spaces of the core tubes 41 and 51, there are respectively inserted platinum tubes 41a and 51a which are made of tubular platinum plates having a shape corresponding to the internal shape of the core tube 41 and 51, respectively.

Inlet ports 41b and 51b are provided in the neighborhood of one end of the core tubes 41 and 51, respectively, at which the dry glove box 21 is provided, and an inert gas such as N$_2$, and Ar may be introduced into the core tubes 41 and 51 through the inlet ports 41b and 51b, respectively. A gaseous substance including the inert gas which has been introduced into the core tube 41 and 51, a gas which has been produced in the inside of the core tubes 41 and 51, etc., may be discharged from exhaust ports 41c and 51c respectively provided at the other end of the core tubes 41 and 51. Crucibles 24 and 25 to be respectively placed in the core tubes 41 and 51 are disposed on mounts 45 and 55, and can be taken out from the core tubes 41 and 51 and moved to the dry glove box 21 side through the above-mentioned cap 43 and 53.

In the inside of the dry glove box 21, there may be provided an operating glove 31, an observation window 32, an entry locking device (not shown), an annealing vessel, etc.

Hereinbelow, the present invention will be in more detail with reference to Examples.

EXAMPLE 1

Fluoride glass was produced by using a heating furnace (fluoride glass melting apparatus) as shown in FIG. 2.

ZrF$_4$, BaF$_2$, LaF$_3$, AlF$_3$ and NaF as raw material (powder) for a core were mixed in a mole ratio of 58:18 6:3:15, and NH$_4$F·HF was added to the resultant mixture. On the other hand, ZrF$_4$, BaF$_2$, LaF$_3$, AlF$_3$ and NaF as raw material for a cladding were mixed in a mole ratio of 55: 12:6:3:24, and NH$_4$F·HF was added to the resultant mixture. The amounts of NH$_4$F·HF to be added to the raw materials were 20% of the total amount of the raw material for the core, and 5% of the total amount of the raw material for the for the cladding.

Each of these raw materials was put in a platinum crucible 1, a cover 2 made of a platinum plate is put on the crucible 1. The crucibles 1 (at least one Pt cruicible for core preparation, and at least one Pt cruicible for cladding preparation) respectively containing therein the above-mentioned raw materials were placed on a tray 3 and put in the inside of a core tube 4, then a cover 10 for the core tube was closed. Thus, setting was completed.

After the crucibles were set in the manner as described above, while dry argon gas was introduced through a gas supply port 5 at a rate of about 3.5 liters per minute, the inside of the core tube 4 was evacuated through a gas outlet port 6 so that the internal pressure of the core tube 4 was maintained at −400 mm $H_2O$. The internal pressure of the core tube 4 was measured by use of a pressure gauge 8 and was maintained at a constant level by operating an inlet valve 9 and an outlet valve 11 to adjust the gas flow rate.

The internal temperature of the core tube 4 was set to 350° C. by a use of heater 7 and was maintained for one hour, and oxide and/or hydroxide to be contained in the raw material was fluorinated with HF produced from the decomposition of the above-mentioned $NH_4F \cdot HF$. Subsequently, the internal temperature of the core tube was raised up to 850° C. at a rate of 20° C./min. In this heating process, it was observed that water droplets in an amount of 1 ml or more were attached to a piping disposed outside of the outlet port 6. In other words, it was confirmed that a large amount of $H_2O$ was discharged from the core tube 4.

After the internal temperature of the core tube was maintained at 850° C. for 1.5 hours, the temperature was lowered to 650° C. and was maintained for one hour. Thereafter, the resultant product was subjected to casting, thereby to provide fluoride glass as a preform or base material for optical fiber.

Figure 5:
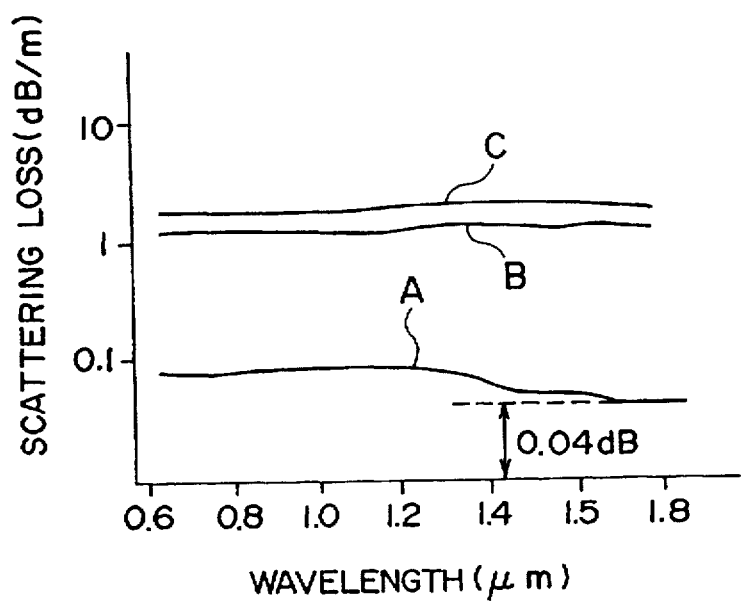
FIG. 5 is a graph showing the degree of scattering loss of optical fibers prepared in Example 1 and Comparative Example 1.

The thus obtained preform was then subjected to fiber drawing to obtain a multi-mode type optical fiber, and the loss of the resultant multi-mode optical fiber was measured. The results of the measurement are shown by line "A" in FIG. 5. As shown in FIG. 5 (line "A"), the scattering loss of the fiber due to crystals which is not dependent on wavelength was as extremely low as 0.04 dB/m.

EXAMPLE 2

Fluorination and melting of raw materials were conducted under the same conditions as in Example 1 except that the internal pressure of the core tube was changed within a range of +100 to −1000 mm $H_2O$, thereby to provide fluoride glasses (preforms for optical fiber).

Figure 6:
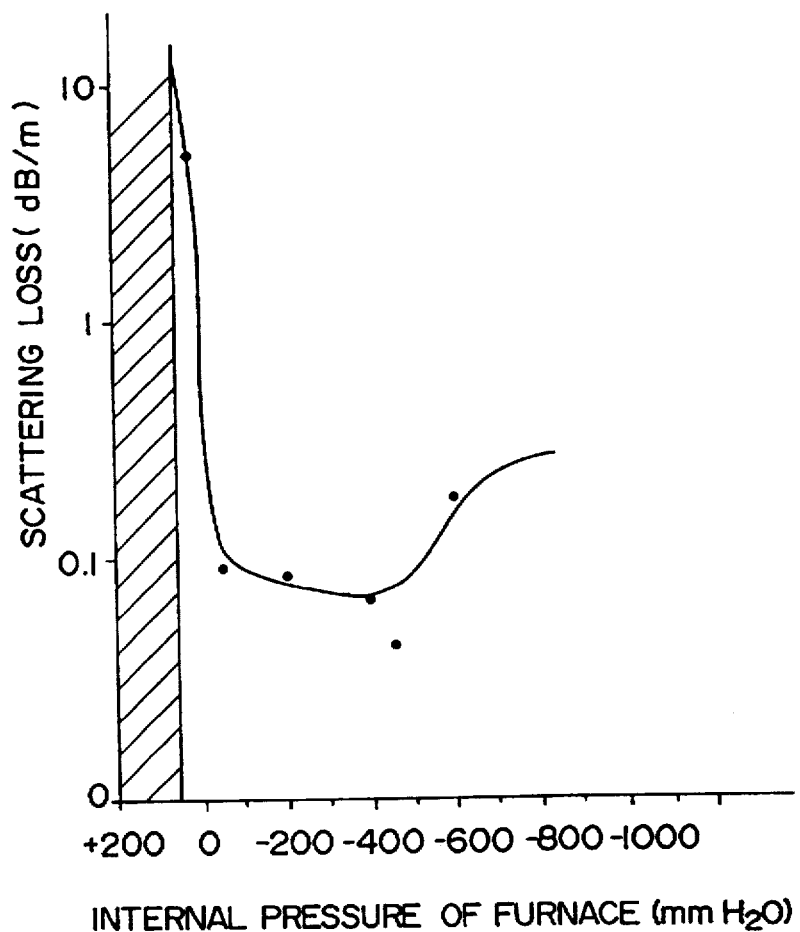
FIG. 6 is a graph showing a relationship between the degree of scattering loss of optical fibers prepared in Example 2 and the internal pressure of the furnace at the time of glass production.

The resultant preform2 were then subjected to fiber drawing to obtain multi-mode type optical fibers, and the scattering loss of the resultant multi-mode optical fibers was measured. A relationship between the thus obtained scattering loss and internal pressure of the core tube is shown in FIG. 6. In FIG. 6, the scattering losses corresponding to the internal pressures of −50, −200, −400, −450 and −600 $mmH_2O$ are respectively 0.1, 0.09, 0.07, 0.04 and 0.2 dB/m.

As shown in FIG. 6, in the core tube internal pressure range of −100 to −500 mm $H_2O$, optical fibers having a scattering loss of below 0.1 dB/m were obtained. When the internal pressure of the core tube was raised from −100 mm $H_2O$, the resultant scattering loss was steeply increased and reached 5 dB/m at an internal pressure of the core tube of 0 mm $H_2O$. When the internal pressure was further raised to +50 mm $H_2O$, the resultant scattering loss was not lower than 20 dB/m. The hatched portion in FIG. 6 corresponds to a region where the scattering loss was considerably high and the scattering loss could not be measured.

On the other hand, when the internal pressure of the core tube was decreased from −500 mm $H_2O$, the resultant scattering loss was increased from 0.5 dB/m to 1 dB/m. According to the present inventors' investigation, a reason for such an increase in the scattering loss was considered to be that excessive reduction of the internal pressure of the core tube invited the vaporization of a component having a high vapor pressure such as $ZrF_4$ during the melting process.

From the above results, it has been found that an internal pressure of the core tube (vessel) in the range of −50 to −1000 $mmH_2O$ in the fluorinating and melting step is preferred in order to obtain a fluoride glass optical fiber with a low scattering loss, and that an internal pressure of the core tube in the range of −100 to −500 $mmH_2O$ in the fluorinating and melting step is preferred in order to obtain a fluoride glass optical fiber with a low scattering loss of less than 0.1 dB/m.

Comparative Example 1

Two species of fluoride glass were produced by conducting fluorination and melting under the same conditions as in Example 1 except that the internal pressure of the core tube was set to +20 $mmH_2O$ only for five minutes during the fluorinating stage (i.e., for a period of time when the temperature is maintained at 350° C.); or the internal pressure of the core tube was set to +20 $mmH_2O$ only for five minutes during the melting stage (i.e., for a period of time when the temperature is maintained at 850° C.).

The resultant two species of fluoride glass (preforms) were subjected to fiber drawing to provide two species of multi-mode optical fibers. The scattering losses of the thus obtained optical fibers were measured. The measurement results are shown in FIG. 5, wherein the line C denotes the scattering loss of the optical fiber produced from the former fluoride glass, and the line B denotes the scattering loss of the optical fiber produced from the latter fluoride glass. As shown in FIG. 5, it has been found that each of the scattering losses of the above-mentioned two species of optical fibers obtained in this Comparative Example are extremely high as compared with that of the optical fiber (line "A") resulting from fluoride glass produced under a negative pressure of −400 $mmH_2O$ throughout the production steps therefor (i.e., fluorination and melting steps).

In view of the above result, it has been found that, if the internal pressure of the core tube changes to a slightly positive pressure during the fluorination and melting step, an impurity gas can remain in the resultant glass and the scattering loss of the resultant optical fiber is increased even when the internal pressure is controlled to a negative pressure in the other or subsequent step and that the negative internal pressure of the core tube may preferably be continuously maintained during the fluorinating and melting step.

EXAMPLE 3

Fluoride glass was produced by use of an apparatus according to the present invention as shown in FIG. 3.

Referring to FIG. 3, a pair of 50 g raw materials comprising $ZrF_4$, $BaF_2$, $LaF_3$, $AlF_3$, and NaF were prepared in a dry glove box 21. These raw materials to which a fluorinating agent of $NH_4HF_2$, in an amount of 5 weight % had been added as an additive were put in a pair of melting crucibles 24 and 25 placed on a mount 45 and set in a core tube 41.

Then, the crucibles 24 and 25 are heated at 400° C. in an argon atmosphere and the temperature was maintained for one hour to remove or fluorinate oxide contained in the raw materials in the crucibles 24 and 25. Thereafter, the crucibles 24 and 25 were heated to 850° C. and kept at this temperature for 1.5 hours in an argon atmosphere to melt the raw materials in these crucibles. Then the cap 43 was removed and the crucibles 24 and 25 together with the mount 45 were taken out from the core tube 41 and moved into the dry glove box 21 by using gloves 31.

The resultant molten mixture in the crucibles 24 and 25 were poured into a mold and vitrified by suction casting, and the resultant glass was gradually cooled to obtain a rod. The thus obtained rod was a preform for optical fiber having a core/clad waveguide structure. Then, the preform was subjected to fiber drawing to provide an optical fiber. The resultant optical fiber showed a good transmission loss of 80 dB/Km with respect to light having a wavelength $\lambda$ of 1.3 µm.

For comparison, a preform having the same composition as described above was prepared by using the same apparatus as that of FIG. 3 except that the platinum tube 41a had been removed from the core tube 41. At this time, the heat treating procedure in the heating and melting step was the same as that described above.

When the resultant preform of this Comparative Example was observed, it was found that a large amount of fine crystals had been formed in the preform. When the above crystal was analyzed, it was confirmed that the crystal was a compound of Si. The preform of Comparative Example was subjected to fiber drawing to obtain an optical fiber. However, light did not pass through the resultant optical fiber having a length of 10 meters.

In the present invention, as a modification of the apparatus shown in FIG. 3, a platinum layer (not shown) formed by deposition (inclusive of vapor-phase deposition, wet deposition process, etc.) such as plating on the internal surface of the core tube 41 can also be used instead of the platinum tube 41a. Such an example is briefly described below.

The inside of the core tube 41 made of quartz was coated with a platinum layer having a thickness of approximately 80 µm by electroless plating. By use of an apparatus including the thus coated core tube 41, a preform and an optical fiber was prepared in the same manner as described above. As a result, there was obtained a good optical fiber which was substantially the same as the optical fiber of Example as described above.

Alternatively, the inside of the core tube 41 made of quartz was coated with a platinum layer having a thickness of approximately 30 µm by sputtering. By use of an apparatus including the thus coated core tube 41, a preform and an optical fiber was prepared in the same manner as described above. As a result, there was obtained a good optical fiber which was substantially the same as the optical fiber of Example as described above.

EXAMPLE 4

Fluoride glass was produced by use of an apparatus according to the present invention as shown in FIG. 4.

The compositions of raw materials for the core and cladding (there was only one cladding layer in this Example) used in this Example are as described below. In the following compositions, a design value (intended value) of specific refractive index difference $\Delta n$ is 1%. When the following composition is used, in order to minimize the transmission loss of an optical fiber to be prepared, the melting temperature may preferably be set to 870° C. for the raw material for the core and 880° C. for the raw material for the cladding, and the temperature of molten mixture for casting may preferably be set to 660° C. for the core and 670° C. for the cladding.

(1) Core:53 $ZrF_4$—21 $BaF_2$—4 $LaF_3$—3 $AlF_3$—18 NaF (mol %)

(2) Cladding:11 $ZrF_4$—17 $BaF_2$—4 $LaF_3$—4 $AlF_3$ —22 NaF—40 $HfF_4$ (mol %) 50 g of the raw material for the core and 2.5 g of $NH_4HF_2$ were put in one crucible 24, and 100 g of the raw material for the cladding and 5 g of $NH_4HF_2$ were put in the other crucible 25. The crucible 24 was placed on a mount 45 and put in the core tube 41. The crucible 25 was placed on the mount 55 and put in the core tube 51, and the caps 43 and 53 were attached to the core tubes 41 and 51, respectively. The crucibles 24 and 25 were heated at approximately 400° C. and kept for one hour in an argon atmosphere, and oxide contained in the raw material was removed (or fluorinated). Then, heaters 42 and 52 were independently controlled so that the crucible 24 containing the raw material for the core was heated at 870° C. and the crucible 25 containing the raw material for the cladding was heated at 880° C., respectively, in an argon atmosphere to melt the raw materials in the crucibles 24 and 25. Thereafter, the molten mixture for the core was kept at 660° C. and the molten mixture for the cladding was kept at 670° C., respectively, for one hour in an argon atmosphere so that the temperatures of the molten mixtures and the temperatures of the argon atmosphere were respectively set to the same temperature.

Subsequently, the cap 53 was removed, the crucible 25 together with the mount 55 was taken out from the core tube 51 and moved into a dry glove box 21 by using gloves 31, and the molten mixture for the cladding was poured into a cylindrical casting mold (not shown), which was heated at 260° C. in advance, and was subjected to casting. Then, the cap 43 was removed and the crucible 24 together with the mount 45 was taken out from the core tube 41 and moved into the dry glove box 21 by using the gloves 31. The molten mixture for the core was subjected to casting similarly as described above and was left standing for a predetermined period of time.

All of the above-mentioned operations were carried out in an inert gas atmosphere. A preform thus obtained was then gradually cooled and was subjected to fiber drawing under heating thereby to produce an optical fiber having an outside diameter of 125 µm.

Figure 7:
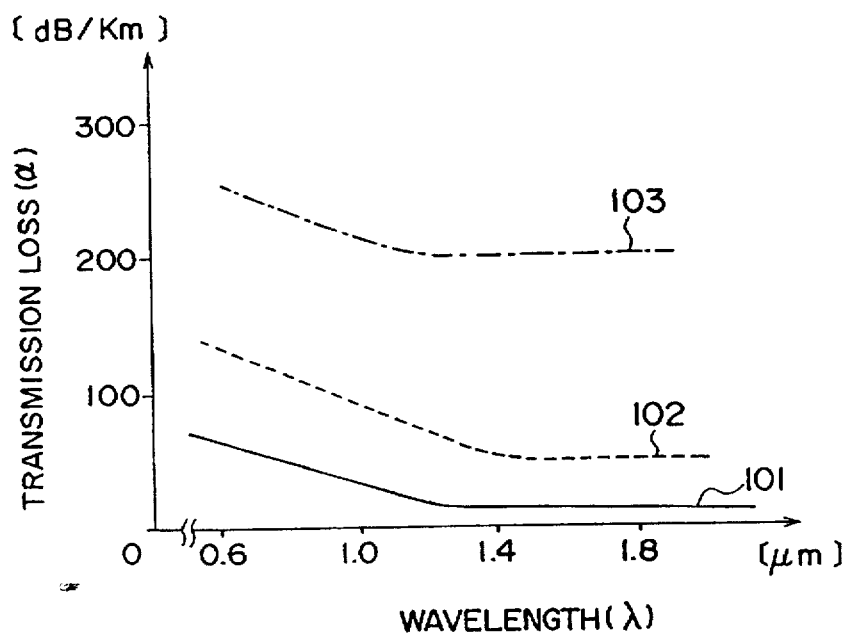
FIG. 7 is a graph showing a difference in transmission loss among the optical fibers of fluoride glass prepared in Example 4.

The transmission loss of the thus produced optical fiber was measured with respect to wavelength of transmission light. The measurement results are shown by a solid line 101 in the graph of FIG. 7. As shown in FIG. 7, the transmission loss for light having a wavelength $\lambda$ of 1.3 µm was excellent as low as 20 dB/Km.

Separately, an optical fiber was prepared by using the same raw materials as described above in this Example according to another method.

More specifically, the same raw materials for the core and the cladding were melted at 880° C. by using an apparatus for producing fluoride glass which was provided with only one heating furnace. Then, the temperature of the molten mixture for casting was set to 670° C., and an optical-fiber was prepared in the same steps as described above.

The transmission loss of the thus produced optical fiber was measured with respect to wavelength of transmission light. The measurement results are shown by a broken line (short dashed line) 102 in the graph of FIG. 7. As shown in FIG. 7, the transmission loss for light having a wavelength $\lambda$ of 1.3 µm was 80 dB/Km.

In addition, fluoride glass was separately prepared in the same manner using the same raw materials as described above except for using an apparatus for producing fluoride glass of Comparative Example, which was not provided with the platinum tube 41a or 51a in FIG. 3 or 4. By use of the thus prepared fluoride glass, an optical fiber was prepared in the same manner as described above.

The transmission loss of the thus produced optical fiber was measured with respect to wavelength of transmission light. The measurement results are shown by a dashed line (alternate long and short dash line) 103 in the graph of FIG.

7. As shown in FIG. 7, the transmission loss for light having a wavelength λ of 1.3 μm was 220 dB/Km.

As a result of comparison of the broken line 102 and the dashed line 103 shown in FIG. 7, it was confirmed that when a platinum tube was inserted into the core tube of an apparatus for producing fluoride glass in accordance with the present invention, the transmission loss of the resultant optical fiber was improved by approximately 140 dB/Km with respect to light having a wavelength of 1.3 μm or more.

In addition, as a result of comparison of the solid line 101 and the broken line 102 shown in FIG. 7, it was confirmed that when the temperatures of the materials for a core and a cladding were independently controlled in accordance with the present invention, the transmission loss of the resultant optical fiber was further improved by approximately 60 dB/Km with respect to light having a wavelength of 1.3 μm or more.

The present invention is not limited to the above-described specific embodiments or examples. For example, in the case of an apparatus for producing fluoride glass as shown in FIG. 4, the melting temperature and the temperature of molten mixture for casting may be changed corresponding to the thermal property of the raw material(s) when the composition of the raw materials for fluoride glass is changed. On the other hand, a heat-resistant material other than quartz or $SiO_2$ (such as $Al_2O_3$) may also be used as a base material of the core tube 41 and/or 51 of which internal surface is to be coated with platinum. Moreover, entirety of the core tube 41 and/or 51 can be formed by using platinum or a material containing platinum.

EXAMPLE 5

Figure 8:
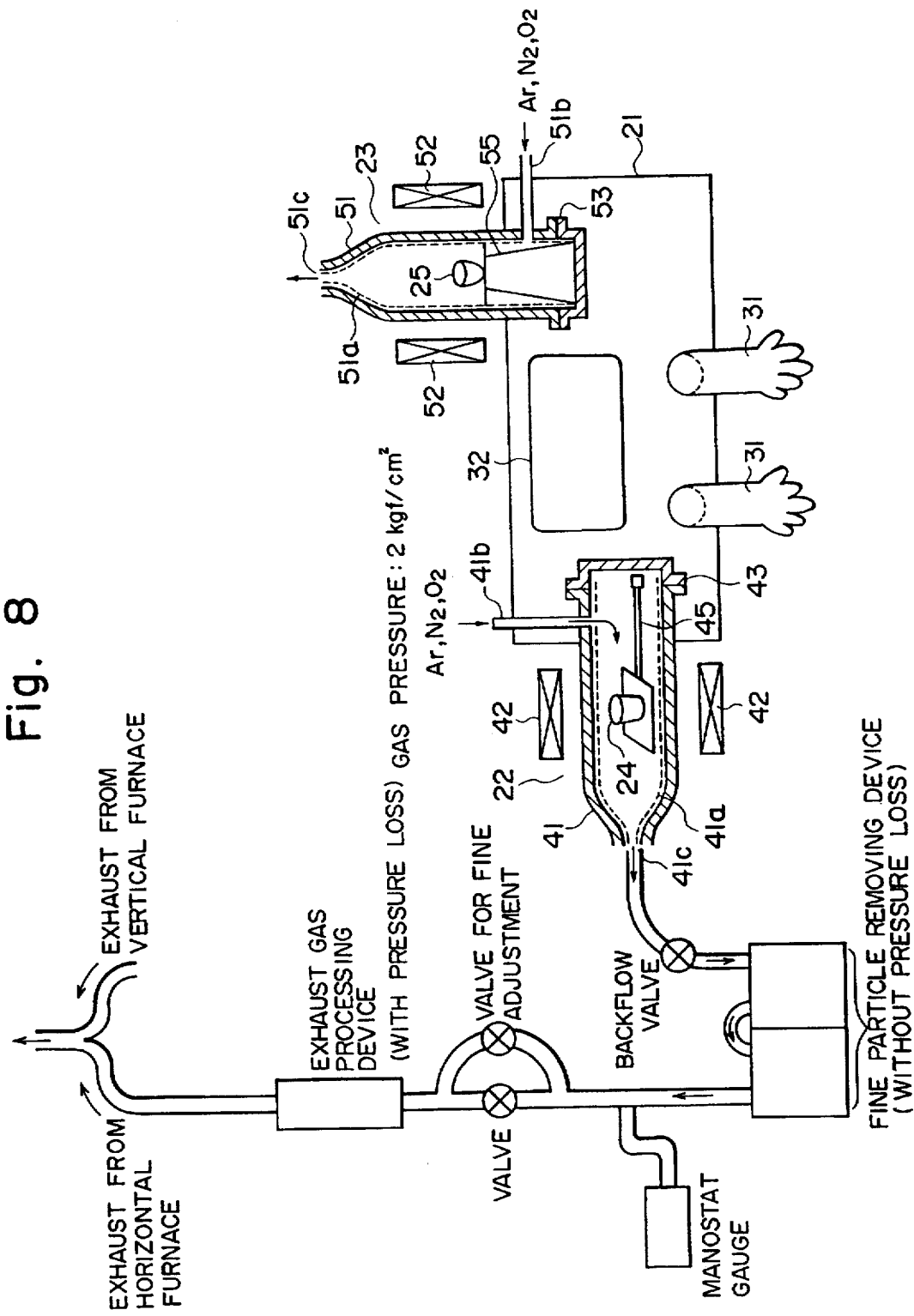
FIG. 8 is a schematic sectional (partially perspective) view showing an apparatus for producing fluoride glass according to a further embodiment of the present invention to which piping is connected.

Fluoride glass was produced by use of a production apparatus as shown in FIG. 8. The compositions of raw materials used in this Example were as follows. In the following description, "Δn" denotes a specific refractive index difference.

| | $ZrF_4$ | $BaF_2$ | $LaF_3$ | $YF_3$ | $AlF_3$ | NaF | LiF | $PbF_2$ | $HfF_4$ |
|---|---|---|---|---|---|---|---|---|---|
| Core (Δn: about 3.5 %) | 53.5 | 18 | 5 | 2 | 2.5 | 0 | 10 | 9 | 0 |
| Core (Δn: about 1%) | 53 | 21 | 4 | 0 | 3 | 18 | 0 | 0 | 0 |
| Cladding (common) | 11 | 17 | 4 | 0 | 4 | 22 | 0 | 0 | 40 |

(When the above compositions were used for fluoride glass for a single-mode optical fiber, 1 wt. % of Er was further added to the composition for the core (Δn : about 1%) for use in an optical fiber amplifier for 1.55 μm band, and 1000 ppm of Pr was further added to the composition for the core (Δn about 3.5%) for use in an optical fiber amplifier for 1.3 μm band. )

60 g of a raw material for a core having the above composition to which 5 wt. % of $NH_4HF_2$ had been added, and 120 g of a raw material for a cladding having the above composition to which 5 wt. % of $NH_4HF_2$ had been added, were respectively weighed and mixed for 12 hours.

Figure 9:
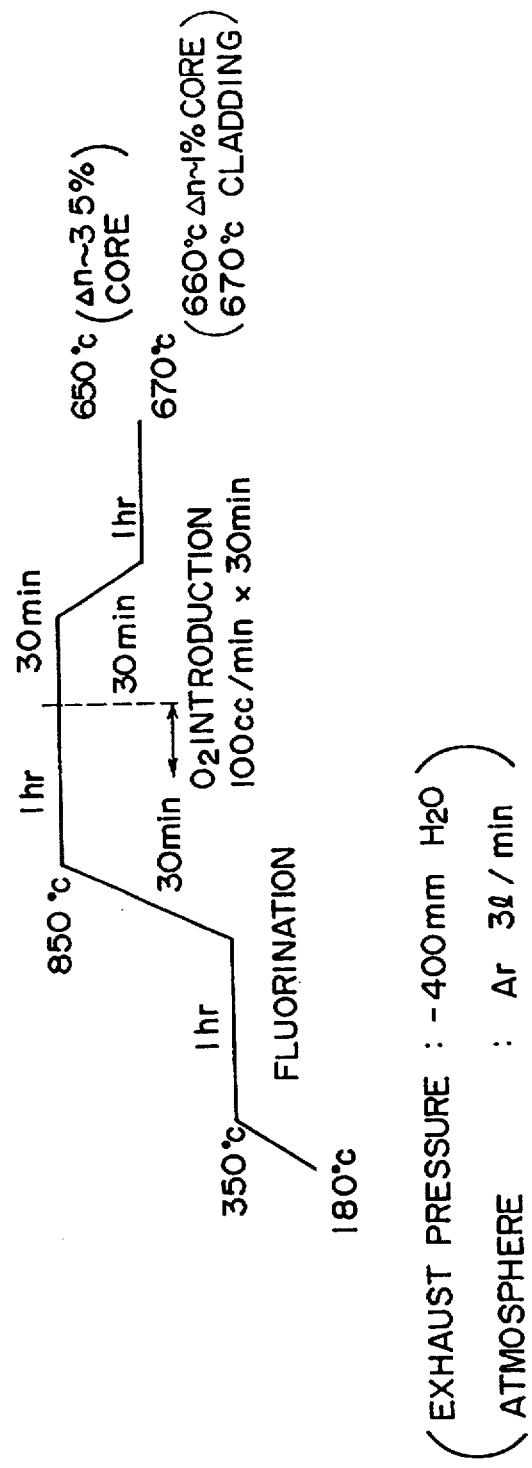
FIG. 9 is a view for illustrating a condition of temperature to be usable in a fluorination and melting step in the present invention.

Then, the above raw materials were subjected to fluorination and melting treatment. At this time, the internal temperature of the heating vessel (furnace) was controlled in a manner as shown in FIG. 9. More specifically, the internal temperature was elevated to 350° C. and maintained for 1 hour (fluorination). Then, the internal temperature was elevated from 350° C. to 850° C. in 30 min. and maintained for 1.5 hours. At this step of 850° C., 100 cc/min. of $O_2$ was introduced into the reaction system for 30 min. for the purpose of removing carbon contained in the raw material based on a reaction of $C+O_2 \rightarrow CO_2$, and oxidizing Zr which had been reduced at the time of the fluorination (Reference: "Fluoride Glass Optical Fibers", by P. W. FRANCE et al., published by Blackie, 1990, p 182; U.S. Pat. No. 4,741,752; U.S. Pat. No. 4,848,997). The introduction of $O_2$ was initiated at a point of time of 30 min. after the beginning of the 850° C. step, and terminated at a point of time of 30 min. before the termination of the 850° C. step. Thereafter, the temperature was decreased to 650° C. (final temperature) in 30 min. and the final temperature was maintained for 1 hour (in the case of the production of fluoride glass for a core having Δn of about 3.5%). In the case of the production of fluoride glass for a core having Δn of about 1% and for a cladding, the final temperature was set to 670° C. In this fluorination and melting step, the exhaust pressure was –400 $mmH_2O$ and the atmosphere was Ar (flow rate : 3 liters/min ), thereby to provide three species of fluoride glass (for a core having Δn of about 3.5%, for a core having Δn of about 1% and for a cladding). Other conditions used in this step were as follows:

Core tube : core tube of quartz and an internal sleeve of Pt inserted therein (diameter of the Pt sleeve =70 mm)

Crucible : reinforced Pt crucible of 50 cc provided with a reinforced Pt cap

Figure 10:
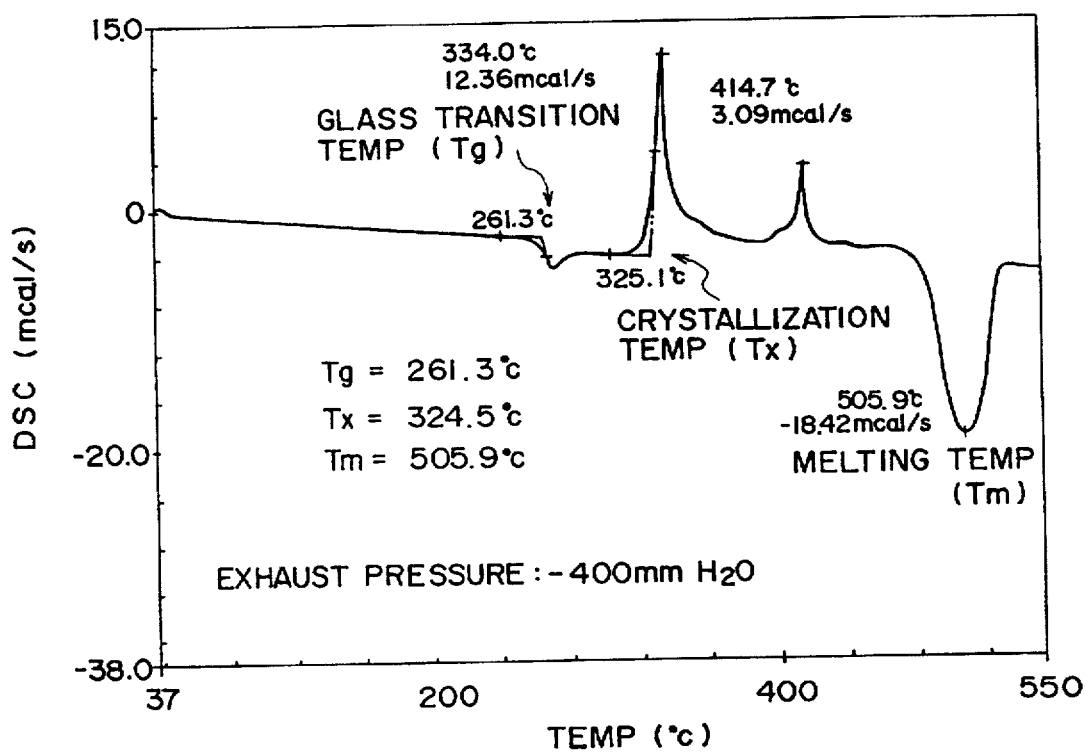
FIG. 10 is a DSC (differential scanning calorimetry) chart for fluoride glass for a core having a Δn of about 3.5% produced under an exhaust pressure of −400 mmH$_2$O.
Figure 11:
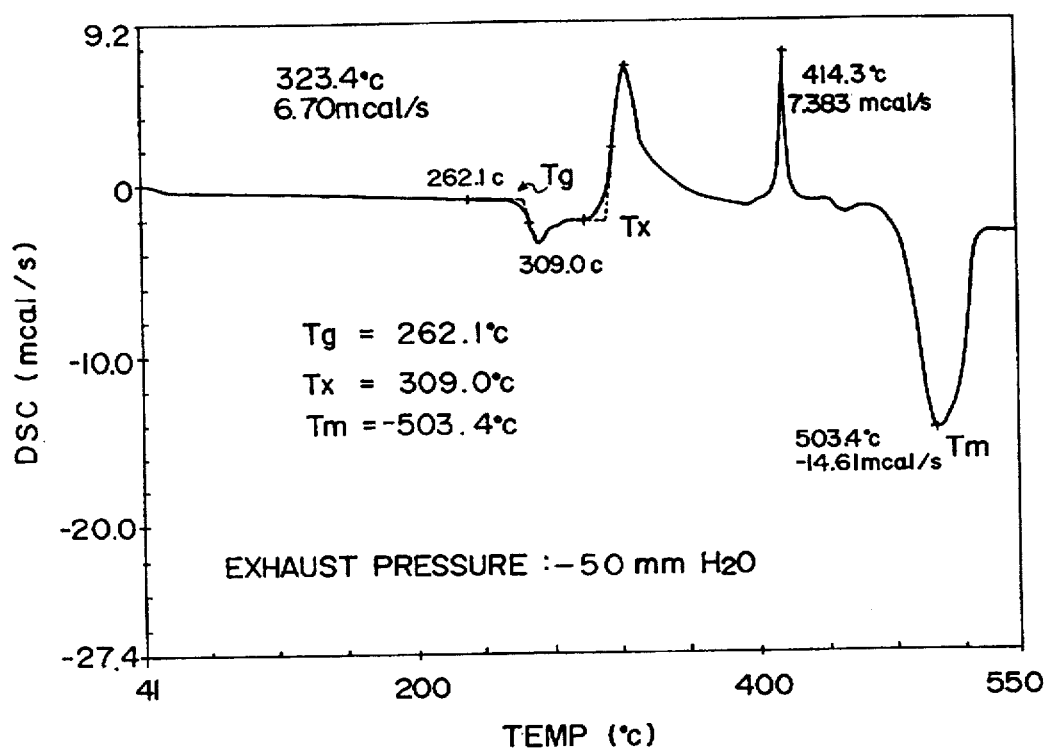
FIG. 11 is a DSC chart for fluoride glass for a core having a Δn of about 3.5% produced under an exhaust pressure of −50 mmH$_2$O.
Figure 12:
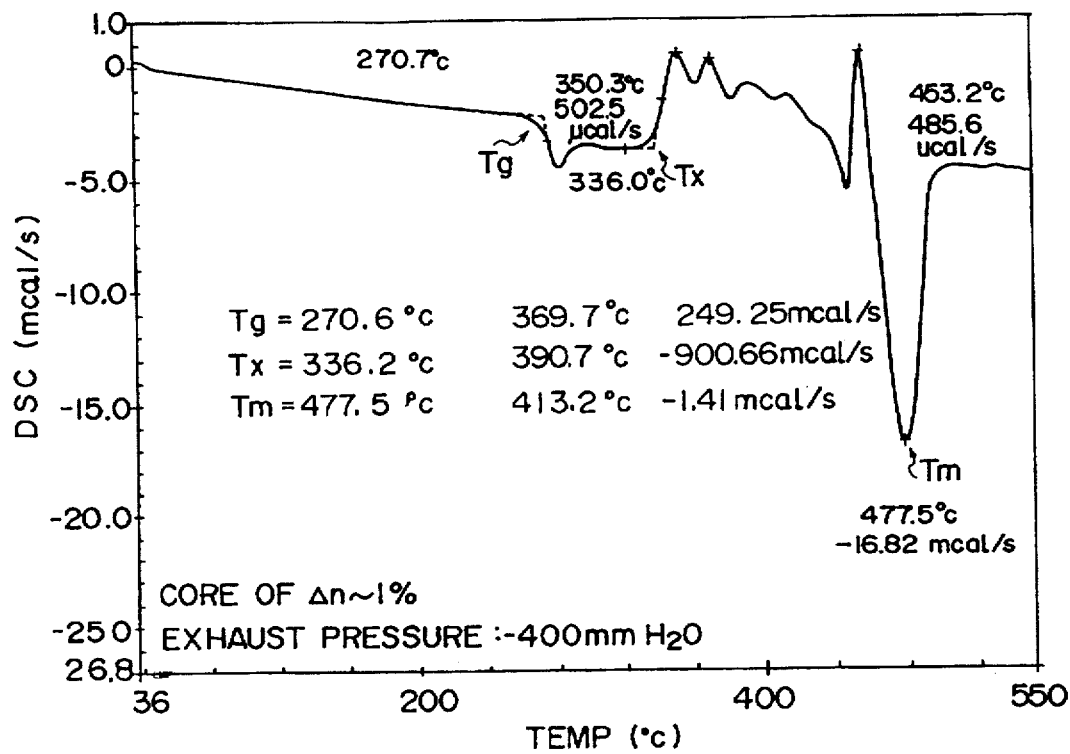
FIG. 12 is a DSC chart for fluoride glass for a core having a Δn of about 1% produced under an exhaust pressure of −400 mmH$_2$O.

FIG. 10 shows results of DSC (differential scanning calorimetry) analysis of the resultant fluoride glass for a core (Δn: about 3.5%) produced under an exhaust pressure of –400 $mmH_2O$. FIG. 11 shows results of DSC analysis of the resultant fluoride glass for a core (Δn: about 3.5%) produced under an exhaust pressure of –50 $mmH_2O$. FIG. 12 shows results of DSC analysis of the resultant fluoride glass for a core (Δn: about 1%) produced under an exhaust pressure of –400 $mmH_2O$. In these figures, Tg denotes a glass transition temperature, Tx denotes a crystallization temperature, and Tm denotes a melting temperature.

In the field of glass, it is generally known that glass shows a higher stability as the following "Hruby Factor" thereof is larger.

"Hruby Factor"≡(Tx–Tg)/(Tm–Tx)

In the above FIG. 10, Tg=261.3° C., Tx=324.5° C. and Tm=505.9° C., and therefore the Hruby Factor is 0.350; in the above FIG. 11, Tg=262.1° C., Tx=309.0° C. and Tm=503.4° C., and therefore the Hruby Factor is 0.241; and in the above FIG. 12, Tg=270.6° C., Tx=336.2° C. and Tm=477.5° C., and therefore the Hruby Factor is 0.464

In FIGS. 10 to 12, the measurement conditions were as follows:

<FIG. 10>

Sampling: 1.0 sec

Sample weight: 132.500 mg

Temp. increasing rate: 10.0 deg./min

Thermocouple: PR themocouple (Pt, Pt-Rh)

<FIG. 11>

Sample weight: 132.000 mg (The other conditions were the same as those in FIG. 10.)

<FIG. 12>

Sample weight: 138.300 mg (The other conditions were the same as those in FIG. 10.)

In general, it is considered that the stability of glass is affected by various factors such as composition thereof, cooling rate at the time of glass formation, and amount of impurity mixed in the glass. As described hereinabove, according to the present inventors' investigation, the above-mentioned amount of impurity mixed in the glass has a correlation with the exhaust pressure in the heat-melting step for the glass production.

The thus obtained fluoride molten mixtures were then subjected to casting by suction casting using a casting mold. This casting step was conducted under atmospheric pressure in dry nitrogen. The casting mold was heated up to 180° C. in advance.

The casting procedure was as follows:
(1) The electric furnace was opened and the crucible was taken out therefrom.
(2) Casting for a cladding was started.
(3) Casting for a core was started.
(4) The subsequent annealing was started.

Figure 13:
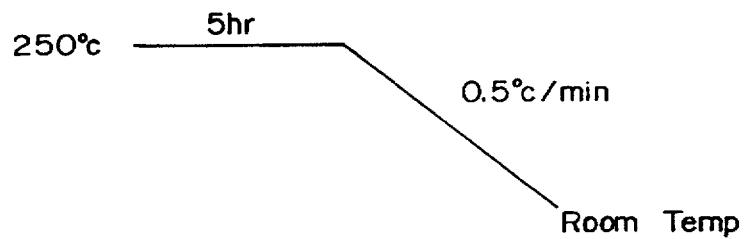
FIG. 13 is a view for illustrating a condition of temperature to be usable in an annealing step in the present invention.

The casting product was then subjected to annealing. The annealing was conducted according to a program as shown in FIG. 13.

After the annealing, the annealed product (preform) was subjected to fiber drawing in dry nitrogen to provide a single-mode optical fiber and a multi-mode optical fiber.

The present invention is not limited to the above-described specific embodiments or examples. More specifically, in the process according to the present invention, the following conditions may preferably be used.

Addition amount of $NH_4HF_2$, : 0–30 wt. % (particularly preferably, about 5 wt. %)

Temperature for fluorination : 350 ±50° C. (particularly preferably, about 350° C.)

Temperature for melting (maximum temp.) : 850±50° C. (particularly preferably, about 850° C.)

Temperature for melting (final temp.) : 650±20° C. (particularly preferably, about 650° C.) for core for Δn of about 3.5%;

670°±20° C. (particularly preferably, about 670° C.) for core for Δn of about 1%; and 670°±20° C. (particularly preferably, about 660°–670 ° C.) for cladding Flow rate of inert gas: 1–10 liter/min. (particularly preferably, about 3 liter/min. )

Inert gas: Ar, $N_2$, or Ar+$N_2$ (particularly preferably, Ar)

Preheating temp. of casting mold : 180°–260 ° C. (particularly preferably, 180° C.)

As described hereinabove, according to the present invention, in the production of fluoride glass, an impurity such as oxide and water content, which can originate from a raw material for glass and/or can be produced during the fluorination and/or melting, may be prevented from remaining in the resultant glass, whereby fluoride glass containing less crystals may be provided.

An optical fiber obtained by subjecting the thus produced fluoride glass as a base material to fiber drawing may have an extremely low transmission loss and may suitably be used for long-range communication.

In addition, in the apparatus for producing fluoride glass according to the present invention, the internal surface of the heating furnace comprises a metallic material comprising platinum and therefore production of fluoride compound due to the reaction of the base material of the heating vessel with HF gas may be prevented, even when the raw material for fluoride glass is melted to produce HF gas. Accordingly, when the production apparatus of the present invention is used, fine crystals based on the mixing of the base material into the molten mixture cannot be formed in the resultant fluoride glass and homogeneous or uniform fluoride glass may be produced. As a result, according to the present invention, an optical fiber comprising fluoride glass with low transmission loss may be provided.

Many modifications of the present invention may be made without departing from the essential scope thereof. It should be understood that the present invention is not limited to the specific embodiments as described.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. A process of producing fluoride glass, comprising:
   introducing at least one raw material and at least one fluorinating agent into a heating vessel having an internal metallic surface comprising platinum;
   introducing an inert gas into the heating vessel;
   providing the heating vessel with a pressure difference of not greater than −50 $mmH_2O$ and not less than −1000 $mmH_2O$ and heating the at least one raw material in the heating vessel having the pressure difference so as to melt the at least one raw material and to provide a molten mixture, while the heating vessel has the inert gas therein, the molten mixture comprising a combination of the at least one raw material and the at least one fluorinating agent; and
   subjecting the molten mixture to casting in an operating vessel which is communicated with the heating vessel and thereby obtaining a fluoride glass,
   wherein the pressure difference is equal to an internal pressure in the heating vessel minus the ambient atmospheric pressure.

2. A process according to claim 1, further comprising disposing the at least one raw material and the at least one fluorinating agent into a crucible and introducing the crucible into the heating vessel.

3. A process according to claim 1, wherein the at least one fluorinating agent is $NH_4HF_2$.

4. A process according to claim 1, wherein said step of introducing the inert gas into the heating vessel is conducted at a flow rate of 1 to 10 liters/min.

5. A process according to claim 1, wherein the inert gas comprises at least one member selected from the group consisting of $N_2$, Ar and He.

6. A process according to claim 1, wherein the inert gas comprises at least two members selected from the group consisting of $N_2$, Ar and He.

7. A process according to claim 1, wherein the heating vessel is provided with adjusting means for detecting the internal pressure of the heating vessel and automatically adjusting the internal pressure, and wherein said step of heating the raw material is conducted while the internal pressure of the vessel is maintained by the adjusting means.

8. A process according to claim 1, wherein said heating step comprises at least a first heating stage wherein the at least one raw material is heated to 300°–500° C., a second heating stage wherein the at least one raw material is heated to 700°–900° C., and a third heating stage wherein the at least one raw material is heated to 600°–900° C.

9. A process according to claim 8, wherein the first heating stage is conducted for 30–60 minutes.

10. A process according to claim 8, wherein said heating step further comprises a step of raising a temperature of the at least one raw material at a rate of not less than 20° C./min., said raising step being conducted between the first heating stage and the second heating stage.

11. A process according to claim 8, wherein the third heating stage is conducted for 30 to 90 minutes.

12. A process according to claim 1, wherein said heating step comprises at least a first heating stage wherein the at least one raw material is heated to 700°–900° C., and a second heating stage wherein the at least one raw material is heated to 600°–900° C.

13. A process of producing fluoride glass, comprising:

introducing at least one first raw material and at least one first fluorinating agent into a first heating vessel having a first internal metallic surface comprising platinum;

introducing at least one second raw material and at least one second fluorinating agent into a second heating vessel having a second internal metallic surface comprising platinum, the at least one second raw material being different from the at least one first raw material;

introducing an inert gas into each of the first and second heating vessels;

providing the first heating vessel and the second heating vessel with a first pressure difference and a second pressure difference, respectively, each of the first and second pressure differences being not greater than −50 mmH$_2$O and not less than −1000 mmH$_2$O, and heating the at least one first raw material and at least one second raw material in the respective heating vessels having the first and second pressure differences, respectively, so as to melt the at least one first raw material and the at least one second raw material and to provide first and second molten mixtures in the first and second heating vessels, respectively, while the heating vessels have the inert gas therein, the first molten mixture comprising a combination of the at least one first raw material and the at least one first fluorinating agent, and the second molten mixture comprising a combination of the at least one second raw material and the at least one second fluorinating agent; and subjecting the molten mixtures to casting in an operating vessel which is communicated with both of the first and second heating vessels and thereby obtaining a fluoride glass, wherein the first pressure difference is equal to an internal pressure in the first heating vessel minus the ambient atmospheric pressure, and the second pressure difference is equal to an internal pressure in the second heating vessel minus the ambient atmospheric pressure.

14. A process according to claim 13, further comprising:

disposing the first raw material and the first fluorinating agent in a first crucible and introducing the first crucible into the first heating vessel; and disposing the second raw material and the second fluorinating agent in a second crucible and introducing the second crucible into the second heating vessel.

15. A process according to claim 13, wherein the at least one first and at least one second fluorinating agents each comprises NH$_4$HF$_2$.

16. A process according to claim 13, wherein said step of introducing the inert gas into the heating vessel is conducted at a flow rate of 1 to 10 liters/min.

17. A process according to claim 13, wherein the inert gas comprises at least one member selected from the group consisting of N$_2$, Ar and He.

18. A process according to claim 13, wherein the inert gas comprises at least two members selected from the group consisting of N$_2$, Ar and He.

* * * * *